(12) United States Patent
Chun et al.

(10) Patent No.: US 7,953,022 B2
(45) Date of Patent: May 31, 2011

(54) METHOD AND APPARATUS OF CONTROLLING TRANSMISSION OF DATA BLOCK

(75) Inventors: Sung Duck Chun, Gyeonggi-do (KR); Young Dae Lee, Gyeonggi-do (KR); Myung Cheul Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 225 days.

(21) Appl. No.: 11/910,438

(22) PCT Filed: Mar. 29, 2006

(86) PCT No.: PCT/KR2006/001139
§ 371 (c)(1),
(2), (4) Date: Nov. 18, 2009

(87) PCT Pub. No.: WO2006/104341
PCT Pub. Date: Oct. 5, 2006

(65) Prior Publication Data
US 2010/0054139 A1 Mar. 4, 2010

(30) Foreign Application Priority Data
Mar. 29, 2005 (KR) .................. 10-2005-0026230

(51) Int. Cl.
*H04L 12/26* (2006.01)
*H04L 1/00* (2006.01)
(52) U.S. Cl. .................................. 370/252; 370/231
(58) Field of Classification Search .................. None
See application file for complete search history.

(56) References Cited

U.S. PATENT DOCUMENTS

| 2002/0027884 A1* | 3/2002 | Halme | 370/253 |
| 2004/0165543 A1* | 8/2004 | Nakazawa | 370/252 |
| 2005/0169180 A1* | 8/2005 | Ludwig | 370/231 |
| 2009/0323646 A1* | 12/2009 | Ketchum et al. | 370/338 |

FOREIGN PATENT DOCUMENTS

| CN | 1551551 | 4/2007 |
| EP | 1077559 | 2/2001 |
| EP | 1450521 | 8/2004 |
| RU | 2040116 | 7/1995 |
| RU | 2231224 | 6/2004 |

OTHER PUBLICATIONS

T. He et al., "SPEED: A Stateless Protocol for Real-Time Communication in Sensor Networks," International Conference on Distributed Computing Systems, May 2003.

Xu, X., et al., "Simulation Analysis of RLC Timers in UMTS Systems," Proceedings of the 2002 Winter Simulation Conference, vol. 1, pp. 506-512, Dec. 8, 2002.

* cited by examiner

*Primary Examiner* — Ricky Ngo
*Assistant Examiner* — Clemence Han
(74) *Attorney, Agent, or Firm* — Lee, Hong, Degerman, Kang & Waimey

(57) ABSTRACT

A method of controlling data block transmission in a wireless communication system. The method including transmitting a round trip time measurement request comprising a first identifier to a receiving device, receiving a round trip time measurement response comprising a second identifier from the receiving device in response to the round trip time measurement request, and determining a round trip time based on a transmission time of the round trip time measurement request and a reception time of the round trip time measurement response, wherein the round trip time comprises a processing delay for processing the round trip time measurement request and round trip time measurement response.

30 Claims, 10 Drawing Sheets

FIG. 4
-- Prior Art --

| D/C | PDU type | PA | SUFI$_1$ | | Oct 1 |
|---|---|---|---|---|---|
| | | SUFI$_1$ | | | Oct 2 |
| | | | | | Oct 3 |
| | | ⋮ | | | |
| | | SUFI$_K$ | | | |
| | | PAD | | | Oct N |

FIG. 5
-- Prior Art --

| R2 | PDU type | SUFI$_1$ | Oct 1 |
|---|---|---|---|
| | SUFI$_1$ | | Oct 2 |
| | | | Oct 3 |
| | ⋮ | | |
| | SUFI$_K$ | | |
| | PAD | | Oct N |

FIG. 6
-- Prior Art --

| D/C | PDU type | RSN | R1 | Oct 1 |
|---|---|---|---|---|
| HFNI | | | | Oct 2 |
| HFNI | | | | Oct 3 |
| HFNI | | | | |
| PAD | | | | |
| | | | | Oct N |

FIG. 11

| TYPE = RTT measurement request |
|---|
| Sequence Number |

| TYPE = RTT measurement response |
|---|
| Sequence Number |

METHOD AND APPARATUS OF CONTROLLING TRANSMISSION OF DATA BLOCK

CROSS-REFERENCE TO RELATED APPLICATIONS

This application is a 371 U.S. national stage application of International Application No. PCT/KR2006/001139, filed on Mar. 29, 2006, which claims priority to Korean Application No. 10-2005-0026230, filed on Mar. 29, 2005, the contents of which are incorporated by reference herein in their entirety.

TECHNICAL FIELD

The present invention relates to a method and apparatus for controlling transmission of a data block. Although the present invention is suitable for a wide scope of applications, it is particularly suitable for controlling data block transmission more efficiently by measuring round trip time (RTT) and setting a timer using the measured RTT.

BACKGROUND ART

FIG. 1 is a block diagram of a network structure of a universal mobile telecommunications system (UMTS). Referring to FIG. 1, the universal mobile telecommunications system (hereinafter, referred to as 'UMTS') includes a user equipment 1 (hereinafter, referred to as 'UE'), a UMTS terrestrial radio access network 2 (hereinafter, referred to as 'UTRAN') and a core network 3 (hereinafter, referred to as 'CN'). The UTRAN 2 includes at least one radio network sub-system 4 (hereinafter, referred to as 'RNS') and each RNS includes a radio network controller 5 (hereinafter, referred to as 'RNC') and at least one base station 6 (hereinafter, referred to as 'Node B') managed by the RNC. The Node B 6 includes at least one cell.

FIG. 2 is an architectural diagram of UMTS radio protocol between a UE 1 and UTRAN 2. Referring to FIG. 2, the radio interface protocol horizontally includes a physical layer, a data link layer and a network layer and the radio interface protocol vertically includes a user plane for data information transfer and a control plane for signaling transfer. The protocol layers in FIG. 2 can be divided into L1 (first layer), L2 (second layer), and L3 (third layer) based on lower three layers of the open system interconnection (OSI) standard model widely known in the communications systems. The radio protocol layers exist as pairs in both the UE 1 and UTRAN 2 to facilitate data transmission in the radio section.

The physical layer as the first layer provides an information transfer service to an upper layer using physical channels. The physical layer is connected to a medium access control (MAC) layer above the physical layer via transport channels through which data are transferred between the medium access control layer and the physical layer. The transport channels are classified as dedicated transport channels and common transport channels according to whether or not a channel is shared. Data is transmitted between different physical layers, and more particularly, between the physical layer of a transmitting side and the physical layer of a receiving side via physical channels.

The medium access control (MAC) layer of the second layer provides services to a radio link control (hereinafter abbreviated RLC) layer above the MAC layer via logical channels. The RLC layer of the second layer supports reliable data transfer and is operative in segmentation and concatenation of RLC service data units (SDUs) sent down from an upper layer.

The MAC layer and the physical layer exchange data via the transport channel. The second layer (L2) includes a MAC layer, a radio link control (RLC) layer, a broadcast/multicast control (BMC) layer and a packet data convergence protocol (PDCP) layer.

The MAC layer handles mapping between logical channels and transport channels and provides allocation of the MAC parameters for allocation and re-allocation of radio resources. The MAC layer is connected to an upper layer, called the radio link control (RLC) layer, via a logical channel.

Various logical channels are provided according to the type of information transmitted. In general, a control channel is used to transmit information of the control plane and a traffic channel is used to transmit information of the user plane.

The MAC layer is connected to the physical layer by transport channels and can be divided into a MAC-b sub-layer, a MAC-d sub-layer, a MAC-c/sh sub-layer, a MAC-hs sub-layer and a MAC-e sublayer. The division of the MAC is according to the type of transport channel being managed.

The MAC-b sub-layer manages a BCH (Broadcast Channel), which is a transport channel handling the broadcasting of system information. The MAC-c/sh sub-layer manages a common transport channel, such as a forward access channel (FACH) or a downlink shared channel (DSCH), which is shared by a plurality of terminals, or in the uplink the Radio Access Channel (RACH). The MAC-d sub-layer manages a dedicated channel (DCH), which is a dedicated transport channel for a specific terminal. The MAC-hs sublayer manages a transport channel HS-DSCH (high speed downlink shared channel) for high speed data transfer to support the high speed data transfer in downlink and uplink. The MAC-e sublayer manages a transport channel E-DCH (enhanced dedicated channel) for uplink data transfer.

The radio link control (hereinafter abbreviated 'RLC') layer supports a guarantee of quality of service (hereinafter abbreviated 'QoS') of each radio bearer and also controls the transfer of corresponding data. The RLC layer leaves one independent RLC entity at each RB to guarantee intrinsic QoS of the RB. Three RLC modes are provided to support various QoS; a transparent mode (hereinafter abbreviated 'TM'), an unacknowledged mode (hereinafter abbreviated 'UM') and an acknowledged mode (hereinafter abbreviated 'AM').

The RLC also facilitates adjusting a data size to enable a lower layer to transfer data to a radio section. To facilitate an adjusted data size, the RLC segments and concatenates data received from an upper layer.

The PDCP layer is located above the RLC layer and facilitates transferring data using IP packets, such as IPv4 or IPv6, efficiently in a radio section having a relatively small bandwidth. Toward this end, the PDCP layer performs header compression, a function by which mandatory data header information is transferred to increase transport efficiency in a radio section.

Since header compression is a basic function of the PDCP layer, the PDCP layer exists only in a packet service domain (hereinafter abbreviated 'PS domain'). Furthermore, one PDCP entity exists for each RB in order to provide an effective header compression function to each PS service.

The BMC (broadcast/multicast control) layer is located above the RLC layer. The BMC layer schedules a cell broadcast message and performs broadcasting to UEs located in a specific cell.

A radio resource control (RRC) layer located on the lowest part of the third layer is defined in the control plane only and controls the logical channels, the transport channels, and the physical channels with configuration, reconfiguration, and release of radio bearers (RBs). A RB is a logical path provided by the first and second layers for the data transfer between the UE 1 and the UTRAN 2. Generally, configuring an RB refers to defining the characteristics of protocol layers and channels necessary for providing a specific service and is to establish respective specific parameters and operational methods for them.

Basic functions of the RLC layer are to guarantee QoS of each RB and a corresponding data transfer. Since an RB service is a service that the second layer provides to an upper layer, the entire second layer affects QoS. However, the RLC layer has the greatest effect on QoS.

The RLC layer provides an independent RLC entity at each RB to guarantee the intrinsic QoS of an RB and provides three modes, specifically TM, UM and AM. Since the three RLC modes differ from one another in the supported QoS, their operational methods are different as well as their detailed functions. Therefore, the RLC operational mode must be considered.

TM RLC is a mode in which no overhead is attached to an RLC service data unit (hereinafter abbreviated 'SDU') that is delivered from a higher layer in configuring an RLC protocol data unit (hereinafter abbreviated 'PDU'). Since the RLC transmits the SDU transparently, it is called TM RLC.

Due to these transparent characteristics, the TM RLC plays various roles in user and control planes. In the user plane, the TM RLC performs real-time circuit data transfer, such as voice or streaming data, in a circuit service domain (hereinafter abbreviated 'CS domain') since data processing time within RLC is short. In the control plane, the RLC controls uplink transmission of RRC messages from an unspecific UE or downlink transmission of RRC messages broadcast from all UEs with a cell since there is no overhead within the RLC.

Unlike the transparent mode, a non-transparent mode is a mode in which overhead is added in the RLC. Non-transparent modes are classified into an unacknowledged mode (UM), having no acknowledgement for the transmitted data, and an acknowledged mode (AM), having acknowledgement for the transmitted data.

By attaching a PDU header including a sequence number (hereinafter abbreviated 'SN') to each PDU, UM RLC enables a receiving side to determine which PDU is lost in the course of transmission. Due to this characteristic, the UM RLC primarily performs transmission of real-time packet data, such as broadcast/multicast data transmission, voice of PS domain, (such as, VoIP) and streaming data in the user plane or transmission of RRC messages transmitted to a specific UE or specific UE group within a cell in control plane that require no acknowledgement.

AM RLC is a non-transparent mode that configures PDUs by attaching a PDU header, including an SN, as in UM RLC. However, AM RLC differs from UM RLC in that a receiving side acknowledges the PDUs transmitted by a transmitting side.

The receiving side acknowledges PDU reception in the AM RLC because the transmitting side can request retransmission of a PDU that is not received by the receiving side. The retransmission function is the most outstanding feature of the AM RLC.

An object of the AM RLC is to guarantee error-free data transmission through retransmission. Due to this characteristic, the AM RLC primarily controls transmission of non-real-time packet data, such as TCP/IP of PS domain in the user plane, or transmission of RRC messages transmitted to a specific UE within a cell in control plane for which acknowledgment is mandatory.

TM or UM RLC is used for uni-directional communications, whereas AM RLC is used for bi-directional communications due to the feedback from a receiving side in AM RLC. Since bi-directional communications are primarily used for point-to-point communications, AM RLC uses only a dedicated logical channel. Therefore, one RLC entity includes a transmission or reception structure in TM or UM RLC, whereas a transmitting side and a receiving side exist within one RLC entity in AM RLC.

The complexity of AM RLC is due to the retransmission function. The AM RLC includes a retransmission buffer for retransmission management as well as a transmitting/receiving buffer and performs various functions. The various functions may be related to a transmitting/receiving window for flow control, polling when a transmitting side requests status information from a corresponding RLC entity of a receiving side, status reporting in order that a receiving side may report its buffer status to a corresponding RLC entity of a transmitting side, status PDU for carrying status information and piggybacking by inserting a status PDU in a data PDU to increase data transfer efficiency.

A reset PDU is required in order to request the resetting of all operations and parameters of an AM RLC entity of the other side if an AM RLC entity discovers a critical error during the course of operation. A reset ACK PDU is required for response to the reset PDU.

To support these functions, an AM RLC needs various protocol parameters, status variables and a timer. PDUs used for data transfer control in status information reporting, status PDUs and reset PDUs are called control PDUs and PDUs used for delivery of user data are called data PDUs.

Specifically, PDUs used by an AM RLC may be classified into two types. A first type is a data PDU and a second type is a control PDU. Control PDUs include status PDU, piggybacked status PDUs, reset PDUs and reset ACK PDUs.

As mentioned previously control PDUs are used for a reset procedure. The reset procedure is used in response to an error condition during operation of an AM RLC.

For example, an error condition may result if mutually used sequence numbers are different from each other or a PDU or an SDU transmission fails in excess of a count limit. Through the reset procedure, an AM RLC of a receiving side and an AM RLC of a transmitting side reset environmental variables and then communications are re-enabled.

Once an AM RLC entity, such as an AM RLC of a transmitting side, decides to initiate a reset procedure, a currently used transmitting direction hyper frame number (hereinafter abbreviated 'HFN') value is included in a reset PDU and the reset PDU is transmitted to the corresponding AM RLC entity on the other side, such as an AM RLC of a receiving side. The AM RLC of the receiving side, having received the reset PDU, re-establishes an HFN value of its receiving direction and then resets environmental variables, such as a sequence number.

Subsequently, the AM RLC of the receiving side includes its transmitting direction HFN in a reset ACK PDU and then transmits the reset ACK PDU to the AM RLC of the transmitting side. Upon receiving the reset ACK PDU, the AM RLC of the transmitting side re-establishes its receiving direction HFN value and then resets environmental variables.

FIG. 3 illustrates the structure of an AM RLC PDU. As illustrated in FIG. 3, an AM RLC PDU is used when an AM RLC entity attempts to transmit user data or piggybacked status information and a polling bit. A user data portion is configured as an 8-bit integer multiplication and an AM RLC PDU header is constructed with a 2-octet sequence number. The header part of an AM RLC PDU includes a length indicator.

FIG. 4 illustrates the structure of a status PDU. As illustrated in FIG. 4, a status PDU includes different types of SUFIs (super fields). The status PDU size is variable, but is limited to a size of the largest RLC PDU of a logical channel carrying the status PDU.

The SUFI is utilized to identify what type of AM RLC PDU is received at a receiving side or what type of AM RLC PDU is not received at the receiving side. The SUFI consists of three parts that indicate type, length and value.

FIG. 5 illustrates the structure of a piggybacked status PDU. As illustrated in FIG. 5, the structure of a piggybacked status PDU, while similar to that of a status PDU, differs in that a reserved bit (R2) replaces the D/C field. The piggybacked status PDU is inserted if there is sufficient space in an AM RLC PDU. The PDU type value may be fixed at '000'.

FIG. 6 illustrates the structure of a reset ACK PDU. As illustrated in FIG. 6, a reset PDU includes a 1-bit sequence number (RSN). A reset ACK PDU is transmitted in response to a received reset PDU by including the RSN contained in the received reset PDU.

The 'D/C field' indicates whether a corresponding PDU is a control PDU or a data PDU. The 'PDU Type' indicates a type of the control PDU and, specifically, whether a corresponding PDU is a reset PDU or a status PDU. The 'Sequence Number' value indicates sequence number information of an AM RLC PDU.

The 'Polling Bit' value is set when a request for a status report is made to a receiving side. The 'Extension bit (E)' value indicates whether a next octet is a length indicator. The 'Reserved bit (R1)' value is used for a reset PDU or a reset ACK PDU and is coded as '000'. The 'Header Extension Bit (HE)' value indicates whether a next octet is a length indicator or data. The 'Length Indicator' value indicates a location of a boundary if a boundary exists between different SDUs within a data part of a PDU. The 'PAD' part is a padding area and is not used in an AM RLC PDU.

A method of reducing reception error in an AM RLC entity is explained as follows. Unlike an UM RLC or TM RLC, error-free data transmission is important for an AM RLC.

Specifically, if a receiving side fails to successfully receive an AM RLC PDU transmitted by a transmitting side, the transmitting side keeps transmitting the AM RLC PDUs until they are successfully received. The receiving side informs the transmitting side of reception or failure of the AM RLC PDUs. Included in the information is a status PDU or a piggybacked status PDU.

FIG. 7 is a flowchart illustrating a conventional AM RLC PDU transmitting method according to a first example. As illustrated in FIG. 7, a transmitting side RLC transmits a first AM RLC PDU, a second AM RLC PDU and a third AM RLC PDU.

Assuming that the second AM RLC PDU is lost during transmission, a receiving side RLC is unable to receive the second AM RLC PDU. Therefore, the receiving side RLC determines that the second AM RLC PDU is lost and informs the transmitting side, via a status PDU, that the second AM RLC PDU was not received.

The transmitting side retransmits the second AM RLC PDU in response to the status PDU received from the receiving side. If the receiving side successfully receives the retransmitted second AM RLC PDU, the AM RLC PDU transmitting process is terminated.

As illustrated in FIG. 7, the receiving side transmits the status PDU if an AM RLC PDU is not received, if the transmitting side polls the receiving side AM RLC PDU or if a receiving side transmission interval timer (Timer_Status_periodic) expires. The transmission interval timer (Timer_Status_periodic) is provided to enable the receiving side to send a status PDU periodically and the receiving side transmits the status PDU each time the transmission interval timer (Timer_Status_periodic) expires.

However, the status PDU includes no data, but rather only control information. Unlike an AM RLC PDU, which includes data, the status PDU lowers a real data rate. Therefore, to prevent the status PDU from being sent too frequently, a timer, such as a transmission prohibit interval (Timer_Status_Prohibit) timer, is utilized.

The transmission prohibit interval (Timer_Status_Prohibit) timer is initialized each time the receiving side transmits the status PDU. While the transmission prohibit interval (Timer_Status_Prohibit) timer is active, the receiving side is prevented from transmitting a status PDU.

FIG. 8 is a flowchart illustrating a conventional AM RLC PDU transmitting method according to a second example. As illustrated in FIG. 8, the receiving side determines that a second AM RLC PDU was lost and initiates a transmission interval timer (Timer_Status_periodic) and a transmission prohibit interval timer (Timer_status_Prohibit) while transmitting a status PDU.

Upon receiving a fifth AM RLC PDU, the receiving side determines that a fourth AM RLC PDU was lost. However, since the transmission prohibit interval timer (Timer_status_Prohibit) has not expired, the receiving side does not transmit the status PDU despite having determined that a second PDU was lost.

Also as illustrated in FIG. 8, a re-transmission of the second AM RLC PDU fails as well. However, the receiving side is unable to determine whether the second AM RLC PDU was retransmitted from the transmitting side. The retransmitted second AM RLC PDU may have been lost or the status PDU previously sent by the receiving side to indicate loss at the second AM RLC PDU may have been lost and not delivered to the transmitting side. Therefore, the receiving side again sends the status PDU to the transmitting side to indicate loss of the second AM RLC PDU.

The transmission prohibit interval timer (Timer_Status_prohibit) determines an interval for retransmitting the status PDU. In the previous example, if the transmission prohibit interval timer (Timer_Status_prohibit) expires, the receiving side immediately transmits the status PDU to the transmitting side again.

Since the transmission prohibit interval timer (Timer_Status_prohibit) expires, there is no limitation on the AM RLC transmitting the status PDU. Upon receiving the retransmitted status PDU, the transmitting side retransmits the second AM RLC PDU one again time. Therefore, the receiving side can receive data without error in operation of the AM RLC.

FIG. 9 illustrates a conventional AM RLC PDU transmitting method according to a third example. As illustrated in FIG. 9, it is assumed that there is no transmission prohibit interval timer (Timer_Status_prohibit) and that a transmission interval timer (Timer_Status_periodic) is set to a very short value.

A receiving side again sends a status PDU indicating loss of the second AM RLC PDU before receiving the retransmitted second AM RLC PDU from a transmitting side. Therefore, the transmitting side decides that the retransmitted second AM RLC PDU was also lost in transmission and retransmits the second AM RLC PDU once more. However, if the receiving side successfully receives the first retransmission of the second AM RLC PDU, the second retransmission of the second AM RLC PDU unnecessarily wastes radio resources.

On the other hand, if the transmission interval timer (Timer_Status_periodic) is set to too long a value, a delay before the transmitting side attempts the retransmission is increased. Due to the increased delay, QoS (quality of service) is degraded.

If a value of the transmission interval timer (Timer_Status_periodic) or transmission prohibit interval timer (Timer_status_Prohibit) is set closer to a time required for a transmitting side of a UE to receive a corresponding status response after having sent an AM RLC PDU to a receiving side, system performance can be enhanced. Such a time required for the transmitting to receive a corresponding status response back from the receiving side is called a round-trip time (hereinafter abbreviated 'RTT').

In conventional methods, a value of a transmission interval timer (Timer_Status_periodic) or a transmission prohibit interval timer (Timer_status_Prohibit) is determined when a UE and a serving RNC (hereinafter abbreviated 'SRNC') first configure a RB and the value is unilaterally selected by the SRNC. However, since the SRNC has no measurement value for data transmission of an AM RLC to a UE, the SRNC is unable to select a correct RTT value. Therefore, the value of the transmission interval timer (Timer_Status_periodic) or transmission prohibit interval timer (Timer_status_Prohibit) cannot be set to a correct value.

Furthermore, since a UE keeps moving between cells and since a processor load of the UE or base station fluctuates, an RTT value varies. Therefore, it is necessary to keep updating the value of the transmission interval timer (Timer_Status_periodic) or transmission prohibit interval timer (Timer_status_Prohibit). However, these values are determined by the RRC of the SRNC and provided to the RRC of a UE and the RRC of the UE informs the RLC of the UE of the values to use.

Moreover, signaling between the RRCs takes a lot of time and the timer values are basic attributes of an RB. Therefore, whenever these values are changed, a complicated RB reconfiguration process is required. As a result, an incorrect value of the transmission interval timer (Timer_Status_periodic) or transmission prohibit interval timer (Timer_status_Prohibit) degrades RLC performance and the conventional signaling using the RRC limits the RLC performance as well.

Therefore, there is a need for a system for controlling data block transmission more efficiently by measuring round trip time (RTT) and setting a timer using the measured RTT. The present invention addresses this and other needs.

DISCLOSURE OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

Accordingly, the present invention is directed to a method for controlling transmission of data blocks that substantially obviates one or more problems due to limitations and disadvantages of conventional methods. An object of the present invention is to provide a method and apparatus for controlling a transmission of data blocks by which data block transmission can be controlled more efficiently by measuring the RTT and setting a control timer value according to the measured RTT.

In one aspect of the present invention, a method of controlling data block transmission in a wireless communication system is provided. The method includes transmitting a round trip time measurement request to a receiving device, the round trip time measurement request including a first identifier, receiving a round trip time measurement response from the receiving device in response to the round trip time measurement request, the round trip time measurement response including a second identifier and determining a round trip time based on a transmission time of the round trip time measurement request and a reception time of the round trip time measurement response, wherein the round trip time includes a processing delay for processing the round trip time measurement request and round trip time measurement response.

It is contemplated that the method further includes determining either a data block retransmission prohibit interval and/or a data block retransmission interval according to the round trip time, the data block retransmission prohibit interval for preventing the sending of a data block retransmission request to resend a data block and the data block retransmission interval for initiating the sending of a data block retransmission request to resend a data block. It is further contemplated that the method further includes periodically transmitting a data block retransmission request until receipt of a data block is acknowledged such that the time between successive data block retransmission requests is as least as great as the round trip time.

It is contemplated that the data block includes an acknowledgement mode radio link control protocol data unit. It is further contemplated that the first identifier is the same as the second identifier. Preferably, the first and second identifiers are sequence numbers.

It is contemplated that the method further includes determining the round trip time only when the first identifier is the same as the second identifier. It is further contemplated that the method further includes determining either a round trip time transmission prohibit interval and/or a round trip time transmission interval according to the round trip time, the round trip time transmission prohibit interval for preventing transmission of a next round trip time measurement request and the round trip time transmission interval for initiating transmission of a next round trip time measurement request.

It is contemplated that the method further includes determining a waiting interval according to the round trip time, the waiting interval for initiating retransmission of the round trip time measurement request if the round trip time measurement response is not received. It is further contemplated that the method further includes increasing the waiting interval each time the round trip time measurement request is retransmitted.

It is contemplated that the method further includes incrementing a value of the first identifier each time the round trip time measurement request is retransmitted. It is further contemplated that the method further includes incrementing a retransmission count each time the round trip time measurement request is retransmitted and no longer retransmitting the round trip time measurement request if the count reaches a predetermined value before the round trip time measurement response is received.

It is contemplated that the method further includes including the transmission time of the round trip time measurement request in the round trip time measurement request. It is further contemplated that the round trip time measurement response further includes the transmission time of the round trip time measurement response.

It is contemplated that determining the round trip time includes calculating a difference between the transmission time in the round trip time measurement response and the reception time of the round trip time measurement response. It is further contemplated that the transmission time of the round trip time measurement request includes either a system frame number and/or a connection frame number.

It is contemplated that the method further includes including the round trip time measurement request in either a status PDU or a piggybacked status PDU and the round trip time measurement response in either a status PDU or a piggybacked status PDU. It is further contemplated that determining the round trip time includes computing an average of a plurality of round trip times determined based on the transmission times of a plurality of round trip time measurement requests and the reception times of a plurality of round trip time measurement responses.

It is contemplated that transmitting the round trip time measurement request includes transmitting a plurality of round trip time measurement requests consecutively, each of the plurality of round trip time measurement requests having the same first identifier. It is further contemplated that receiving the round trip time measurement response includes receiving a plurality of round trip time measurement responses consecutively, each of the plurality of round trip time measurement responses having the same second identifier. Preferably, the wireless communication system supports a data receipt acknowledgement from the receiving device.

In another aspect of the present invention, a method of controlling data block transmission in a wireless communication system is provided. The method includes transmitting a data block to a receiving device and retransmitting the data block to the receiving device if receipt of the data block is not acknowledged by the receiving device, wherein retransmission of the data block is according to a round trip time that is updated periodically by transmitting a round trip time measurement request including a first identifier to the receiving device, receiving a round trip time measurement response including a second identifier from the receiving device and determining a difference between a transmission time of the round trip time measurement request and a reception time of the round trip time measurement response in consideration of a processing delay for processing the round trip time measurement request and round trip time measurement response.

It is contemplated that the method further includes the receiving device transmitting a status word, the status word indicating that the data block was not received and wherein updating of the round trip time is initiated by the receiving device if no response is received within a predetermined time interval after transmission of the status word. It is further contemplated that the method further includes the receiving device transmitting a status word, the status word indicating that the data block was not received and wherein updating of the round trip time is initiated by the receiving device if no response is received after a number of retransmissions of the status word that exceeds a predetermined number.

It is contemplated that the method further includes the receiving device transmitting a status word, the status word indicating that the data block was not received and wherein updating of the round trip time is initiated by the receiving device if the data block is received after transmission the status word, the data block received within a time interval that is shorter than a previously determined round trip time, the time interval representing a time between a previous transmission of the data block and a subsequent retransmission of the data block. It is further contemplated that the method further includes updating either a data block retransmission prohibit interval and/or a data block retransmission interval according to the round trip time, the data block retransmission prohibit interval for preventing the sending a data block retransmission request to resend the data block and the data block retransmission interval for initiating the sending of a data block retransmission request to resend the data block.

It is contemplated that the data block includes an acknowledgement mode radio link control protocol data unit. It is further contemplated that the first and second identifiers are sequence numbers.

It is contemplated that the round trip time is updated only when the first identifier is the same as the second identifier. It is further contemplated that the round trip time is periodically updated according to either a round trip time transmission prohibit interval and/or a round trip time transmission interval, the round trip time transmission prohibit interval and round trip time transmission interval based on a previously determined round trip time, the round trip time transmission prohibit interval for preventing a next round trip time update and the round trip time transmission interval for initiating a next round trip time update.

In another aspect of the present invention, a communication apparatus for controlling data block transmission in a wireless communication system is provided. The apparatus includes a transmitting unit adapted to transmit RF signals including a round trip time measurement request to a receiving device, the round trip time measurement request including a first identifier, a receiving unit adapted to receive RF signals including a round trip time measurement response from the receiving device in response to the round trip time measurement request, the round trip time measurement response including a second identifier and a processing unit adapted to determine a round trip time based on a transmission time of the round trip time measurement request and a reception time of the round trip time measurement response, wherein the round trip time includes a processing delay for processing the round trip time measurement request and round trip time measurement response.

It is contemplated that the processing unit is further adapted to determine either a data block retransmission prohibit interval and/or a data block retransmission interval according to the round trip time, the data block retransmission prohibit interval for preventing the sending of a data block retransmission request to resend a data block and the data block retransmission interval for initiating the sending of a data block retransmission request to resend a data block. It is further contemplated that the processing unit is further adapted to control the transmitting unit to periodically transmit a data block retransmission request until receipt of a data block is acknowledged such that the time between successive data block retransmission requests is as least as great as the round trip time.

It is contemplated that the processing unit is further adapted to set the first identifier as a sequence number. It is further contemplated that the processing unit is further adapted to determine the round trip time only when the first identifier is the same as the second identifier.

It is contemplated that the processing unit is further adapted to determine either a round trip time measurement prohibit interval and/or a round trip time measurement transmission interval according to the round trip time and to control the transmitting unit such that transmission of a next round trip time measurement request is prevented according to the round trip time measurement prohibit interval and transmission of a next round trip time measurement request is initiated according to the round trip time measurement transmission interval. It is further contemplated that the processing unit is further adapted to determine a waiting interval according to the round trip time and to control the transmitting unit such that retransmission of the round trip time measurement request is initiated according to the waiting interval if the round trip time measurement response is not received.

It is contemplated that the processing unit is further adapted to increase the waiting interval each time the round trip time measurement request is retransmitted. It is further contemplated that the processing unit is further adapted to increment a value of the first identifier each time the round trip time measurement request is retransmitted.

It is contemplated that the processing unit is further adapted to increment a retransmission count each time the round trip time measurement request is retransmitted and control the transmitting unit such that the round trip time measurement request is no longer retransmitted if the count reaches a predetermined value before the round trip time measurement response is received. It is further contemplated that the processing unit is further adapted to include the transmission time of the round trip time measurement request in the round trip time measurement request.

It is contemplated that the processing unit is further adapted to determine the round trip time by calculating a difference between a transmission time in the round trip time measurement response and the reception time of the round trip time measurement response. It is further contemplated that the processing unit is further adapted to include the round trip time measurement request in either a status PDU or a piggybacked status PDU and to extract the round trip time measurement response from either a status PDU or a piggybacked status PDU.

It is contemplated that the processing unit is further adapted to determine the round trip time by computing an average of a plurality of round trip times determined based on the transmission times of a plurality of round trip time measurement requests and the reception times of a plurality of round trip time measurement responses. It is further contemplated that the processing unit is further adapted to control the transmitting unit to transmit a plurality of round trip time measurement requests consecutively, each of the plurality of round trip time measurement requests having the same first identifier.

It is contemplated that the processing unit is further adapted to process a plurality of consecutively received round trip time measurement responses, each of the plurality of round trip time measurement responses having the same second identifier. It is further contemplated that the wireless communication system supports a data receipt acknowledgement from the receiving device.

In another aspect of the present invention, a method of controlling data block transmission in a wireless communication system is provided. The method includes receiving a round trip time measurement request from a transmitting device, the round trip time measurement request including a first identifier and transmitting a round trip time measurement response to the receiving device in response to the round trip time measurement request, the round trip time measurement response including a second identifier.

It is contemplated that the data block includes an acknowledgement mode radio link control protocol data unit. It is further contemplated that the first identifier is the same as the second identifier. Preferably, the first and second identifiers are sequence numbers.

It is contemplated that the round trip time measurement request further includes the transmission time of the round trip time measurement request. It is further contemplated that the transmission time of the round trip time measurement request includes either a system frame number and/or a connection frame number.

It is contemplated that the method further includes including the transmission time of the round trip time measurement response in the round trip time measurement response. It is further contemplated that the round trip time measurement request is included in either a status PDU or a piggybacked status PDU and the round trip time measurement response is included in either a status PDU or a piggybacked status PDU.

It is contemplated that receiving the round trip time measurement request includes receiving a plurality of round trip time measurement requests consecutively, each of the plurality of round trip time measurement requests having the same first identifier. It is further contemplated that transmitting the round trip time measurement response includes transmitting a plurality of round trip time measurement responses consecutively, each of the plurality of round trip time measurement responses having the same second identifier. Preferably, the wireless communication system supports a data receipt acknowledgement from the receiving device.

In another aspect of the present invention, a communication apparatus for controlling data block transmission in a wireless communication system is provided. The apparatus includes a receiving unit adapted to receive RF signals including a round trip time measurement request from a transmitting device, the round trip time measurement request including a first identifier and a transmitting unit adapted to transmit RF signals including a round trip time measurement response to the transmitting device in response to the round trip time measurement request, the round trip time measurement response including a second identifier.

It is contemplated that the processing unit is further adapted to control the transmitting unit to periodically transmit a data block retransmission request until receipt of a data block is acknowledged such that the time between successive data block retransmission requests is as least as great as a determined round trip time. It is further contemplated that the processing unit is further adapted to set the second identifier as a sequence number.

It is contemplated that the processing unit is further adapted to include the transmission time of the round trip time measurement response in the round trip time measurement response. It is further contemplated that the processing unit is further adapted to extract the round trip time measurement request from either a status PDU or a piggybacked status PDU and to include the round trip time measurement response in either a status PDU or a piggybacked status PDU.

It is contemplated that the processing unit is further adapted to control the transmitting unit to transmit a plurality of round trip time measurement responses consecutively, each of the plurality of round trip time measurement responses having the same second identifier. It is further contemplated that the processing unit is further adapted to process a plurality of consecutively received round trip time measurement requests, each of the plurality of round trip time measurement requests having the same first identifier. Preferably, the wireless communication system supports a data receipt acknowledgement from the receiving device.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 4 is a structural diagram of status PDU;

FIG. 5 is a structural diagram of a piggybacked status PDU;

FIG. 6 is a structural diagram of Reset ACK PDU;

FIG. 11 is a diagram of an RTT measurement response (SUFI) according to one embodiment of the present invention.

BEST MODE FOR CARRYING OUT THE INVENTION

Figure 1:
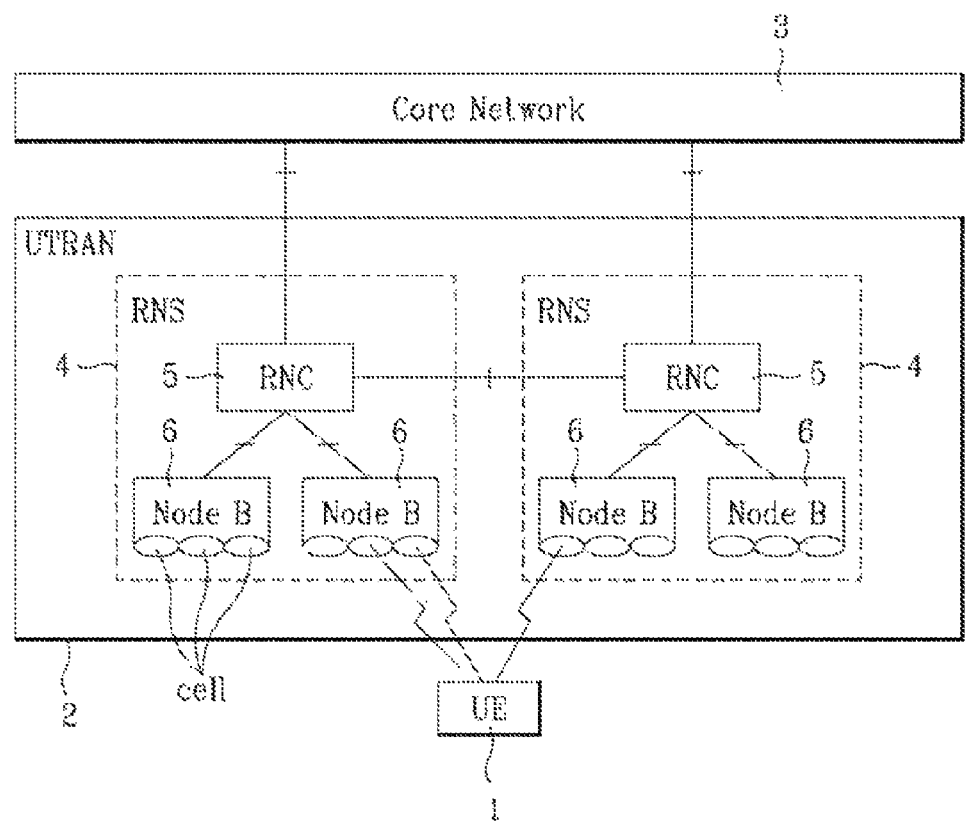
FIG. 1 is a block diagram of a network structure of UMTS (universal mobile telecommunications system)
Figure 2:
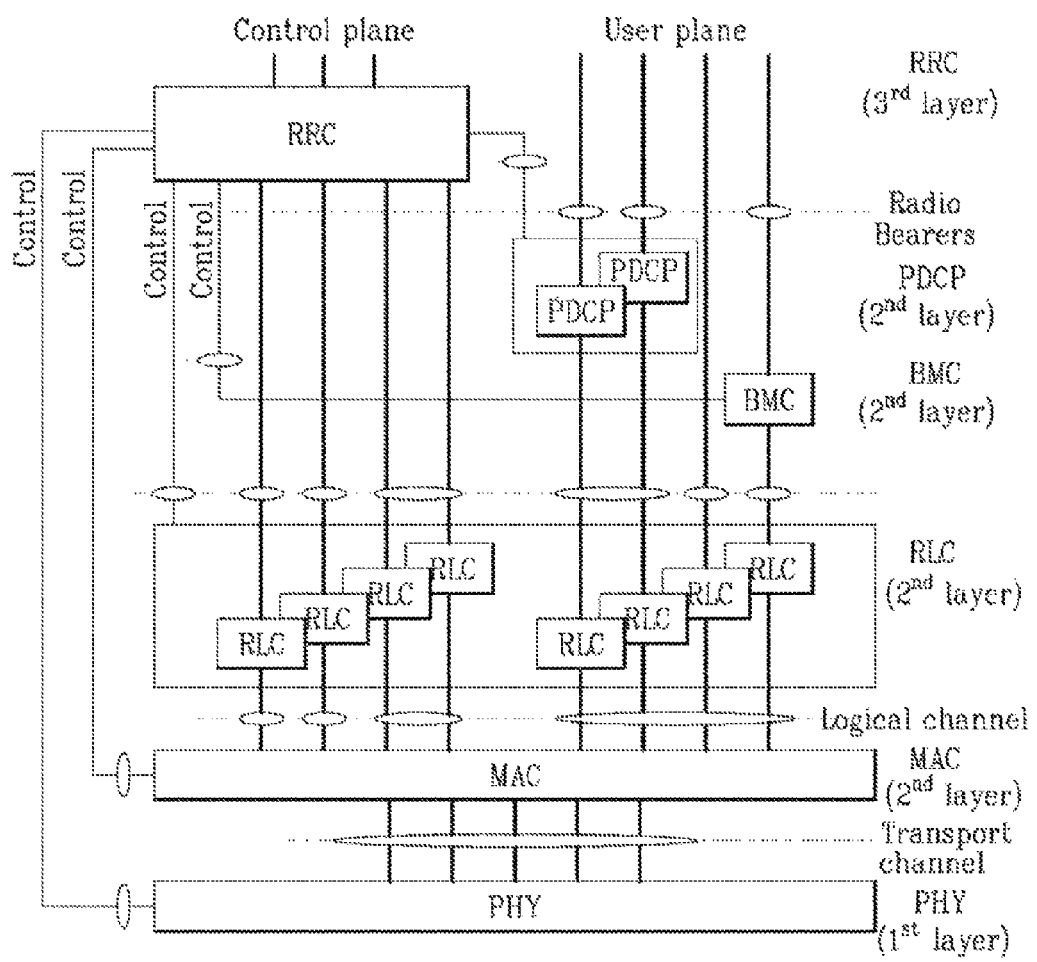
FIG. 2 is a diagram of architecture of UMTS radio protocol.
Figure 3:
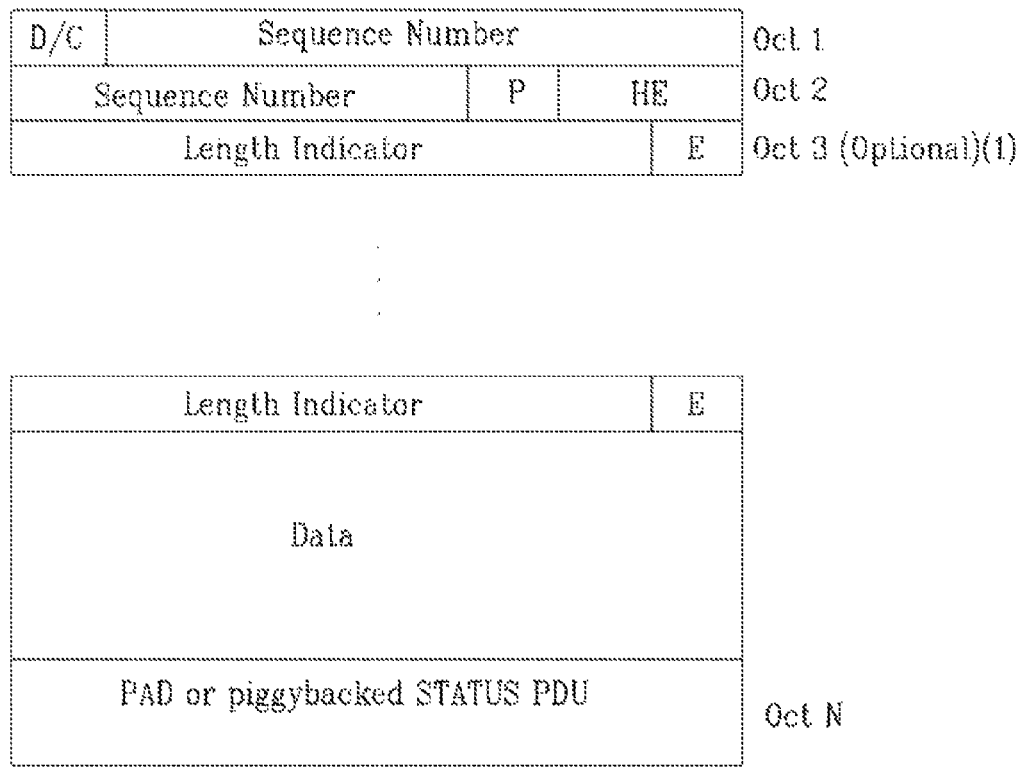
FIG. 3 is a structural diagram of AM RLC PDU.
Figure 7:
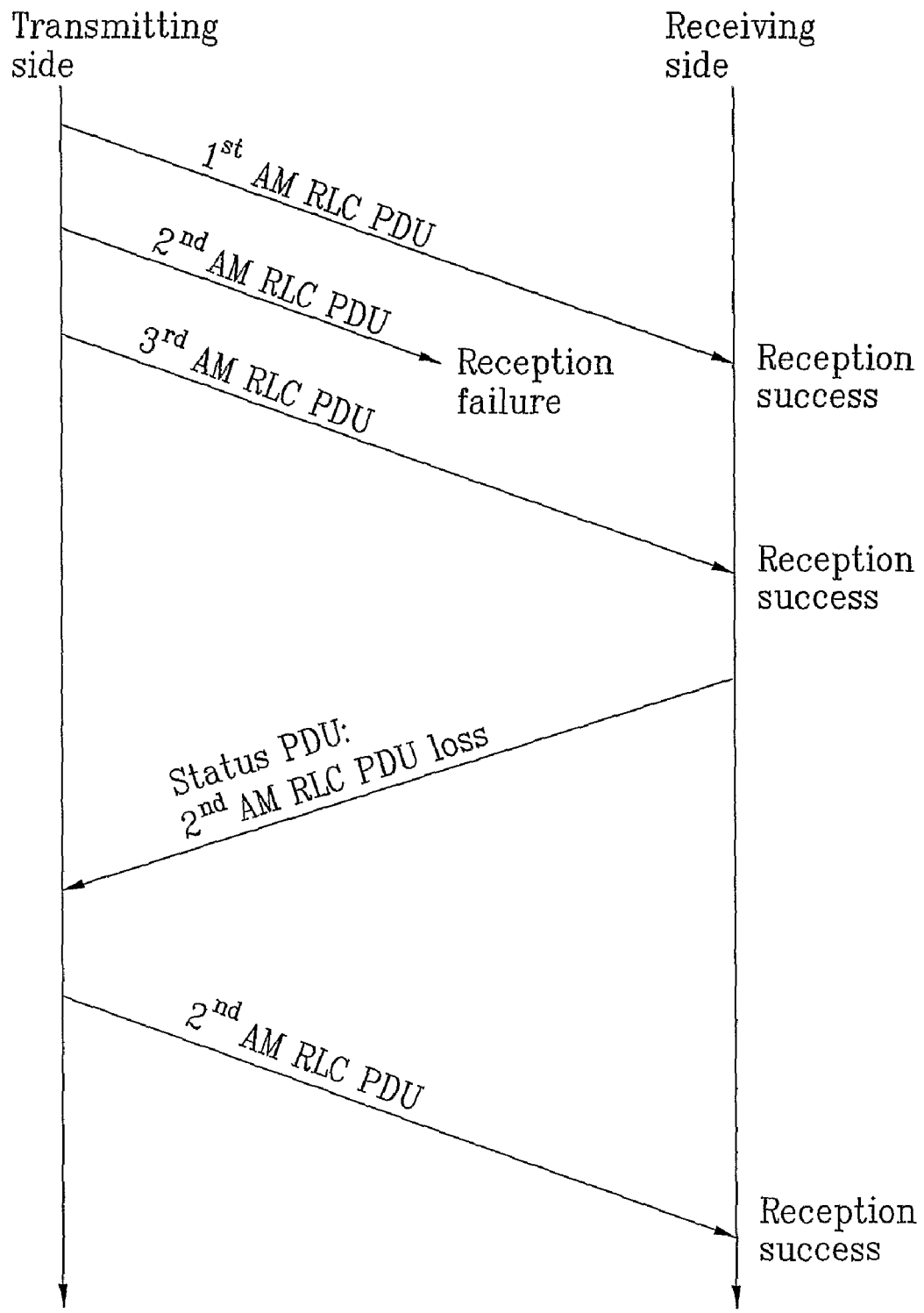
FIG. 7 is a flowchart of a first example of a conventional AM RLC PDU transmitting method.
Figure 8:
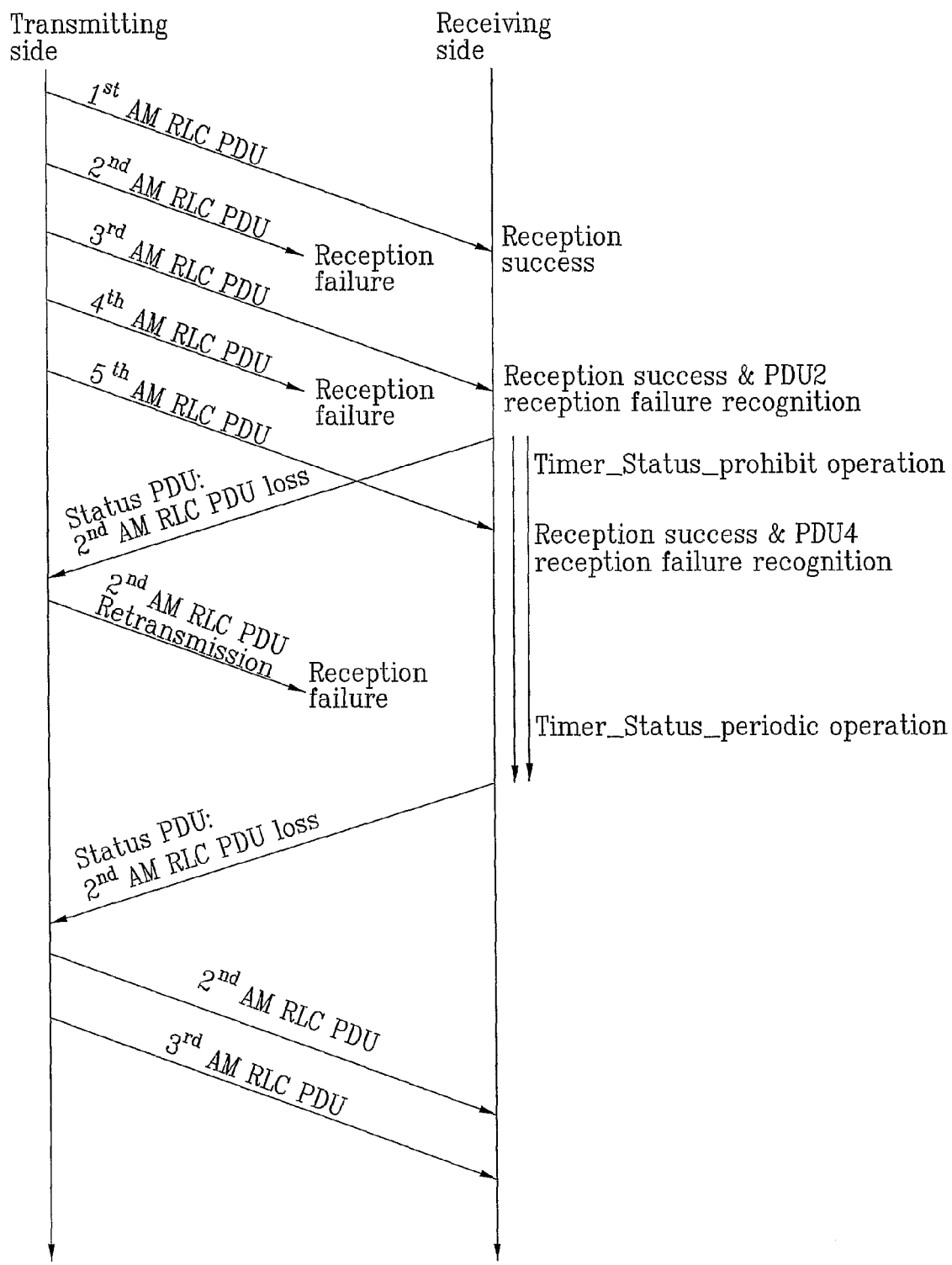
FIG. 8 is a second example of a conventional AM RLC PDU transmitting method.
Figure 9:
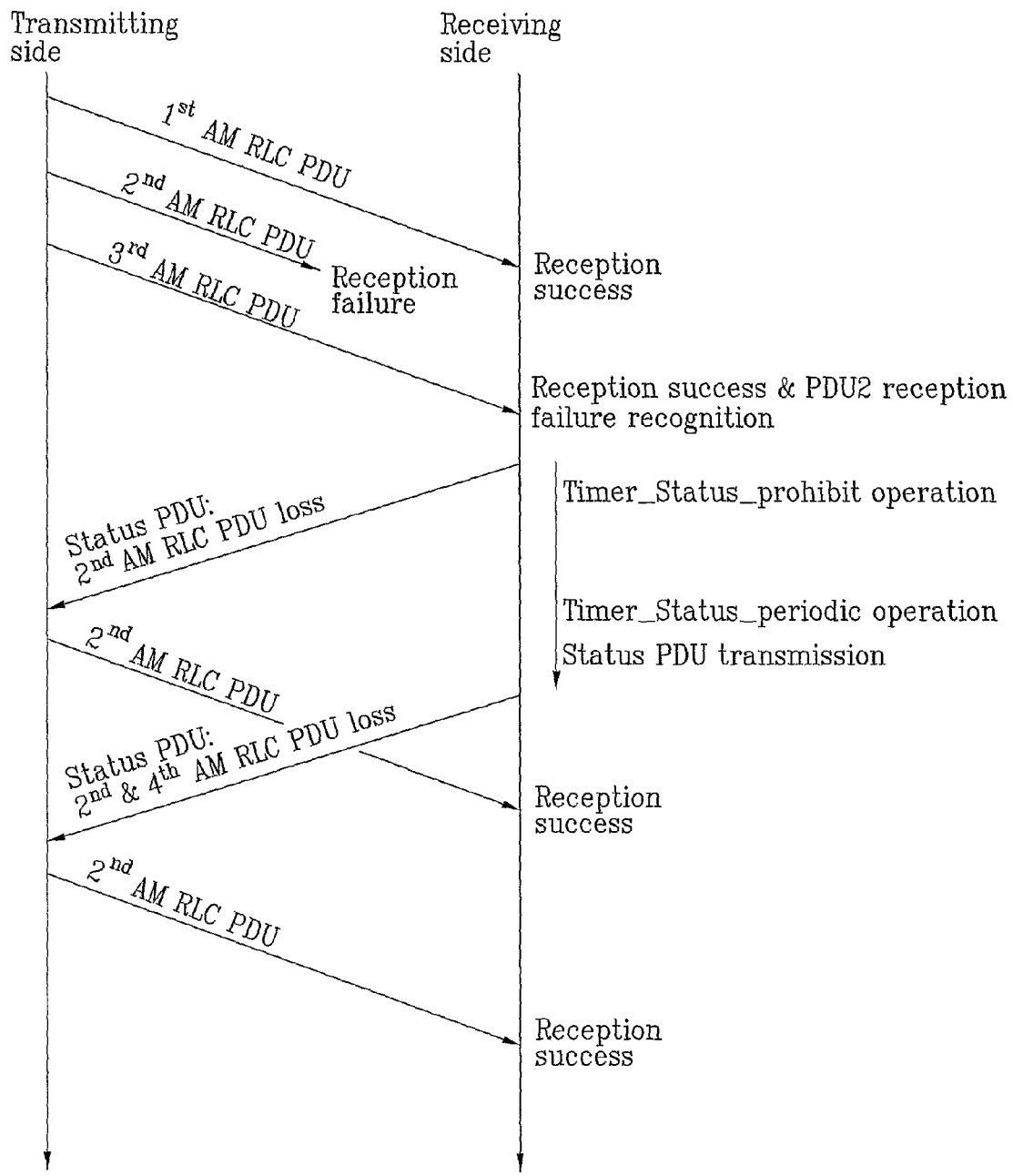
FIG. 9 is a third example of a conventional AM RLC PDU transmitting method.

The present invention relates to an apparatus and method for controlling a transmission of data blocks by which data block transmission can be controlled more efficiently by measuring the RTT and setting a control timer value according to the measured RTT. Although the present invention is illustrated with respect to a mobile communication device, it is contemplated that the present invention may be utilized anytime it is desired to more efficiently control a transmission of data blocks by measuring a round trip time and setting a control timer value according to the measured time.

Reference will now be made in detail to the preferred embodiments of the present invention, examples of which are illustrated in the accompanying drawings. Wherever possible, the same reference numbers will be used throughout the drawings to refer to the same or like parts.

The present invention enables an AM RLC entity to operate with an optimal transmission interval timer (timer_Status_periodic) value and an optimal transmission prohibit interval timer (Timer_status_Prohibit) value, thereby providing a service more efficiently by increasing the data rate. The present invention provides a method to enable an RLC entity to measure a round-trip time (RTT) value and set a transmission interval timer (timer_Status_periodic) value and a transmission prohibit interval timer (Timer_status_Prohibit) value using the measured RTT value.

An AM RNC uses a status PDU or piggybacked status PDU to measure an RTT value. Specifically, an AM RLC attempting to measure the RTT sends a message requesting RTT measurement to an AM RLC of the other side. An AM RLC entity, having received the message, transmits a corresponding response.

The requesting AM RLC uses the status PDU or the piggybacked status PDU to send the RTT measurement request message. Specifically, the AM RLC includes the RTT measurement request (SUFI) in a transmitted status PDU or piggybacked status PDU.

The AM RLC of the other side uses the status PDU or the piggybacked status PDU to transmit an RTT measurement response message in response to the RTT measurement request message. Specifically, the AM RLC includes the RTT measurement response SUFI in a transmitted status PDU or a piggybacked status PDU.

Since the RTT measurement request or response message is transmitted through a radio section, it may be lost in the radio section. Therefore, for more accurate RTT measurement, a sequence number is attached to the AM RLC PDU that includes the RTT measurement request so that a measuring side can identify the RTT measurement response message.

The requesting AM RLC attaches a sequence number to each RTT measurement request message. Upon receiving the RTT measurement response message, the requesting AM RLC processes the RTT measurement response message if a value equal to the sequence number that was sent by the AM RLC is received. If an RTT measurement response message including a value different from the sequence number that was sent by the AM RLC is received, the requesting AM RLC deletes the message or does not process the message.

The requesting AM RLC records a time at which each RTT measurement request message is transmitted. Each time an RTT measurement request message is received, the measuring AM RLC checks the sequence number included in the RTT measurement request message. Upon sending an RTT measurement response message, the measuring AM RLC includes a value equal to the sequence number from the RTT request message in the RTT measurement response message.

To measure a real RTT value, the requesting AM RLC waits for an RTT measurement response message after sending an RTT measurement request message. Upon receiving the RTT measurement response message, the requesting AM RLC checks a sequence number included in the received RTT measurement response message.

If the sequence number is equal to the sequence number previously sent by the AM RNC in the RTT measurement request message, the AM RNC determines a difference between the time the RTT measurement response message was received and the time the RTT measurement request message was sent. The AM RNC then uses the determined difference as a measured RTT value.

The requesting AM RLC executes the RTT measurement process several times to increase reliability of the measurement and to remove variable factors in measurement. The AM RLC determines an average of the measured RTT values for use as an estimated value of real RTT. By determining an average value, a UE can use a number of samples as indicated by a base station.

Subsequently, the requesting AM RNC can set the estimated RTT as a transmission prohibit interval timer (Timer_status_Prohibit) value or a transmission interval timer (Timer_Status_periodic) value. Alternately, the requesting AM RNC may set the transmission prohibit interval timer (Timer_status_Prohibit) value or transmission interval timer (Timer_Status_periodic) value by processing the estimated RTT according to parameters indicated by a base station.

Figure 10:
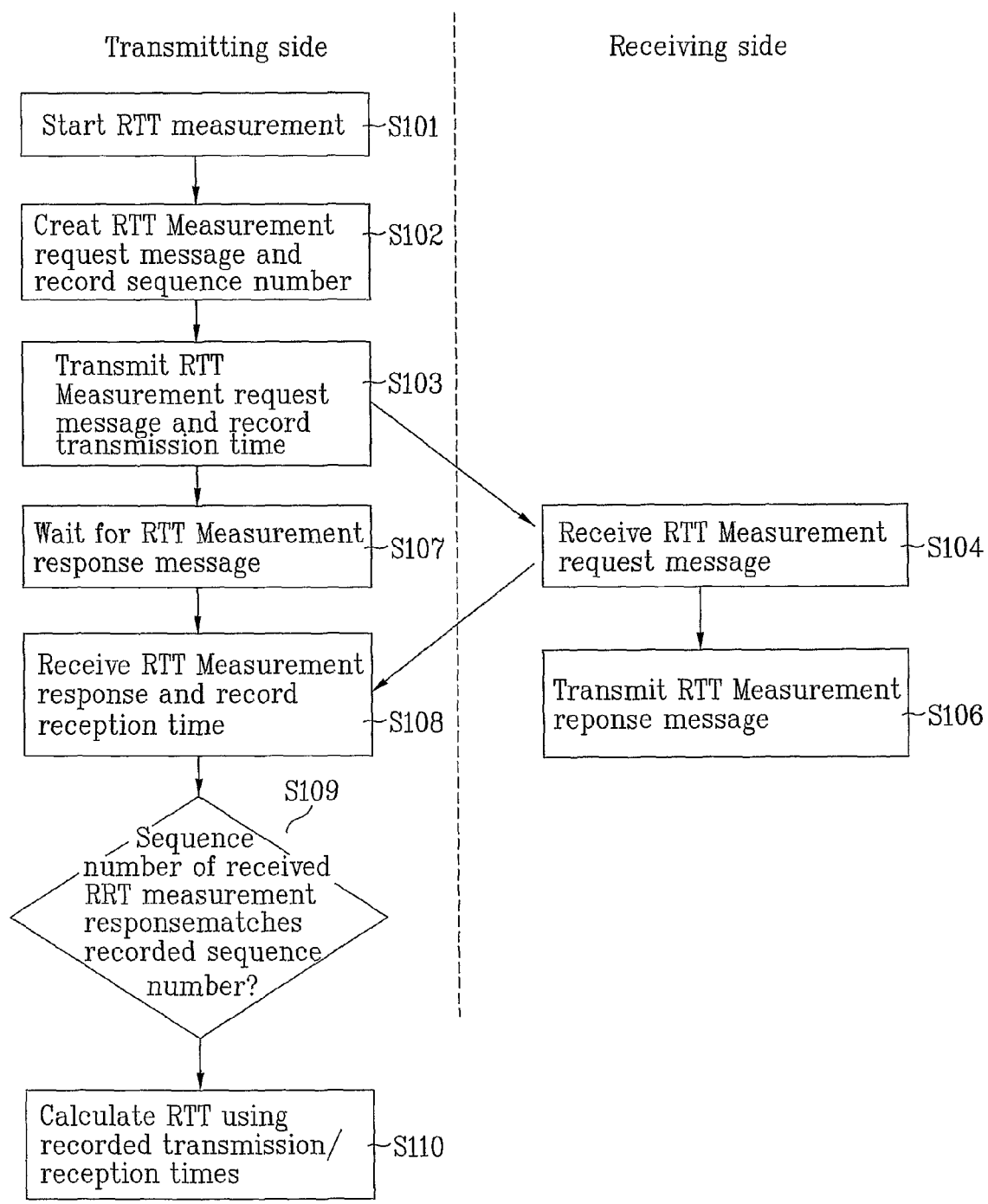
FIG. 10 is a flowchart of an RTT measuring and setting method according to one embodiment of the present invention.

FIG. 10 illustrates a flowchart of an RTT measuring and setting method according to one embodiment of the present invention. As illustrated in FIG. 10, once a transmitting side initiates an RTT measurement (S101), an RTT measurement request message is created and a sequence number is included in the message and recorded in a transmitting side memory (S102). The created RTT measurement request message is transmitted to a receiving side and a time at which the RTT measurement request message is transmitted is recorded in the transmitting side memory (S103).

A receiving side, upon receiving the RTT measurement request message transmitted by the transmitting side (S104), transmits an RTT measurement response message to the transmitting side (S106). After transmitting the RTT measurement request message, the transmitting side waits for an RTT measurement response message (S107). Upon receiving the RTT measurement response message, the transmitting side records a reception time of the RTT measurement response message in the transmitting side memory (S108).

The transmitting side checks a sequence number included in the received RTT measurement response message (S109). If the sequence number in the RTT measurement response message is equal to the sequence number in the transmitted RTT measurement request message, the RTT is calculated using the recorded transmission time and the recorded reception time (S110).

However, for accurate RTT measurement, the receiving side AM RLC must send an RTT measurement response immediately upon receiving an RTT measurement request. In order to accomplish this, an RTT measurement response message can be immediately transmitted without previously set limitations, such as a transmission prohibit interval timer (Timer_status_Prohibit). Furthermore, for more effective measurement, the transmitting side AM RLC can be free from previously set limitations with regard to sending an RTT measurement request.

FIG. 11 illustrates an RTT measurement response SUFI according to one embodiment of the present invention. As illustrated in FIG. 10 and FIG. 11, 'TYPE' is an identifier to identify various types of SUFIs and 'Sequence Number' indicates an RTT measurement response SUFI corresponding to an RTT measurement request SUFI.

Unlike a status PDU, a piggybacked status PDU, which replaces padding of an AM RLC PDU, has no additional overhead. Therefore, to reduce overhead due to the RTT measurement request message, the RTT measurement request message can be included only in a piggybacked status PDU.

However, if RTT measurements are performed too frequently, system performance may be affected. To reduce the effect upon system performance, a network can restrict RTT measurements performed by an AM entity. In order to restrict RTT measurements, an RTT measurement prohibit interval timer can be used. Specifically, after an RTT measurement request has been sent or after an RTT measurement process has been completed, the AM entity initiates the RTT measurement prohibit interval timer. A UE is unable to initiate a new RTT measurement process until the RTT measurement prohibit interval timer expires.

To increase accuracy of the RTT measurement process, an AM entity can send an RTT measurement request message and an RTT measurement response message consecutively. In this way, the probability of losing each message in a radio section is lowered and sequence numbers of the consecutively sent messages are equal to each other. The number of the consecutively sent messages can be determined by the network and indicated to a UE.

If an AM entity periodically performs the RTT measurement, it can be prevent a difference between an actual RTT value and an RTT value determined by a UE from deviating considerably. For periodically performing the RTT measurement, an RTT measurement period timer (periodic timer) is defined. A network can inform a UE of a value of the RTT measurement prohibit interval timer and a value of the RTT measurement period timer (periodic timer).

An AM entity initiates the RTT measurement period timer (periodic timer). Whenever the RTT measurement period timer (periodic timer) expires, the AM entity initiates the RTT measurement process. Each time the RTT measurement process is completed, the AM entity activates the RTT measurement period timer (periodic timer) again.

Since the RTT measurement request message or the RTT measurement response message can be lost in the radio section, the RTT measurement response message may not arrive at the side having made the request for the RTT measurement. An RTT measurement waiting timer can be defined to prevent a side having sent an RTT measurement request message from awaiting the RTT measurement response message indefinitely.

After transmitting an RTT measurement request message, the AM entity activates the RTT measurement waiting timer. If the RTT measurement response message is not received before the RTT measurement waiting timer expires, the AM entity sends the RTT measurement request message again. This retransmission process cannot be repeated indefinitely. To restrict the retransmission process, a count limit of RTT measurement request retransmissions can be set.

In order to remove ambiguity of each retransmission, a sequence number can be changed each time the RTT measurement request is retransmitted. The sequence number can simply be incremented by '1' each time the RTT measurement request is retransmitted. To increase efficiency, each time the RTT measurement request is retransmitted, a value of the RTT measurement waiting timer is increased to accommodate a change of a lower layer.

If an AM PDU is not received by an AM entity, the AM entity transmits a status PDU. If a corresponding response is not received within a uniform duration or if a transmission count of the status PDU indicating that a specific AM PDU is not received exceeds a predetermined value, the AM entity executes the RTT measurement process. Furthermore, if an AM PDU that is indicated as not having been received in the status PDU arrives within a time that is shorter than a previously measured RTT value or a time that is shorter than the transmission prohibit interval timer (Timer_status_Prohibit) value, the AM entity executes the RTT measurement process. Furthermore, Whenever the RTT value is updated, the AM entity updates an associated timer value. The AM entity can appropriately set values associated with polling, such as a polling timer (Timer_poll) or a polling prohibit interval timer (Timer_Poll_prohibit).

The AM entity can also include the time of message transmission when transmitting an RTT measurement request message. In this way, the time included in the RTT measurement request message is a time that can be determined by the AM entities of both sides. Furthermore, the time included can be a system frame number (hereinafter abbreviated 'SFN') as a time reference applied to all UEs located within one cell or a connection frame number (hereinafter abbreviated 'CFN') managed in common by one UE and one SRNC.

Therefore, one side, having received the RTT measurement request message, can obtain the transmission time in one direction using the difference between the time included in the message and the time at which the message was received. Similarly, if the time of transmission of the RTT measurement response message is included in the response message, the side receiving the RTT measurement response message can calculate a portion of RTT using the difference between the time the message was received and the time included in the message. The RTT can then be found by multiplying the measured time by '2'.

Accordingly, the present invention sets a control timer by measuring an RTT value, thereby transmitting data blocks more efficiently.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

INDUSTRIAL APPLICABILITY

The present invention can be applied to a mobile communication system.

What is claimed is:

1. A method of controlling data block transmission in a transmitting device in a wireless communication system, the method comprising:
   transmitting a round trip time measurement request comprising a first identifier to a receiving device;
   receiving a round trip time measurement response comprising a second identifier from the receiving device in response to the round trip time measurement request;
   determining a round trip time based on a transmission time of the round trip time measurement request and a reception time of the round trip time measurement response, wherein the round trip time comprises a processing delay for processing the round trip time measurement request and the round trip time measurement response; and
   determining at least one of a round trip time transmission prohibit interval and a round trip time transmission interval according to the round trip time,
   wherein the round trip time transmission prohibit interval prevents transmission of a next round trip time measurement request and the round trip time transmission interval initiates transmission of a next round trip time measurement request.

2. The method of claim 1, further comprising determining at least a data block retransmission prohibit interval or a data block retransmission interval according to the round trip time,
   wherein the data block retransmission prohibit interval prevents sending a data block retransmission request to resend a data block and the data block retransmission interval initiates sending a data block retransmission request to resend a data block.

3. The method of claim 1, further comprising periodically transmitting a data block retransmission request until receipt of a data block is acknowledged such that the time between successive data block retransmission requests are at least as great as the round trip time.

4. The method of claim 1, wherein a data block comprises an acknowledgement mode radio link control protocol data unit.

5. The method of claim 1, wherein the first identifier is the same as the second identifier.

6. The method of claim 1, wherein the first and second identifiers are sequence numbers.

7. The method of claim 1, further comprising determining the round trip time only when the first identifier is the same as the second identifier.

8. The method of claim 1, wherein the transmission time of the round trip time measurement request comprises at least a system frame number or a connection frame number.

9. The method of claim 1, further comprising including the round trip time measurement request a status Protocol Data Unit (PDU) or a piggybacked status PDU and including the round trip time measurement response in a status PDU or a piggybacked status PDU.

10. The method of claim 1, wherein the wireless communication system supports a data receipt acknowledgement from the receiving device.

11. A method of controlling data block transmission in a transmitting device in a wireless communication system, the method comprising:
    transmitting a data block to a receiving device; and
    retransmitting the data block to the receiving device when receipt of the data block is not acknowledged by the receiving device,
    wherein the data block is retransmitted according to a round trip time that is updated periodically by transmitting a round trip time measurement request comprising a first identifier to the receiving device, receiving a round trip time measurement response comprising a second identifier from the receiving device, and determining a difference between a transmission time of the round trip time measurement request and a reception time of the round trip time measurement response in consideration of a processing delay for processing the round trip time measurement request and the round trip time measurement response,
    wherein the round trip time is periodically updated according to at least one of a round trip time transmission prohibit interval and a round trip time transmission interval, wherein the round trip time transmission prohibit interval and the round trip time transmission interval are based on a previously determined round trip time, and wherein the round trip time transmission prohibit interval is for preventing a next round trip time update and the round trip time transmission interval is for initiating a next round trip time update.

12. The method of claim 11, further comprising transmitting, via the receiving device, a status word,
wherein the status word indicating indicates that the data block was not received, and
wherein updating the round trip time is initiated by the receiving device when a response is not received within a predetermined time interval after transmission of the status word.

13. The method of claim 11, further comprising transmitting, via the receiving device, a status word,
wherein the status word indicating that the data block was not received, and
wherein updating the round trip time is initiated by the receiving device when a response is not received after a number of retransmissions of the status word exceeds a predetermined number.

14. The method of claim 11, further comprising transmitting, via the receiving device, a status word indicating that the data block was not received,
wherein updating the round trip time is initiated by the receiving device when the data block is received after transmission of the status word, or when the data block is received within a time interval that is less than a previously determined round trip time, and
wherein the time interval represents a time between a previous transmission of the data block and a subsequent retransmission of the data block.

15. The method of claim 11, further comprising updating at least one data block retransmission prohibit interval and a data block retransmission interval according to the round trip time,
wherein the data block retransmission prohibit interval prevents sending a data block retransmission request to resend the data block and the data block retransmission interval initiates sending a data block retransmission request to resend the data block.

16. The method of claim 11, wherein the data block comprises an acknowledgement mode radio link control protocol data unit.

17. The method of claim 11, wherein the first and second identifiers are sequence numbers.

18. The method of claim 11, wherein the round trip time is updated only when the first identifier is the same as the second identifier.

19. A communication apparatus for controlling data block transmission in a wireless communication system, the apparatus comprising:
a transmitting unit configured to transmit RF signals comprising a round trip time measurement request to a receiving device,
wherein the round trip time measurement request comprises a first identifier;
a receiving unit configured to receive RF signals comprising a round trip time measurement response from the receiving device in response to the round trip time measurement request,
wherein the round trip time measurement response comprises a second identifier; and
a processing unit configured to determine a round trip time based on a transmission time of the round trip time measurement request and a reception time of the round trip time measurement response, wherein the round trip time comprises a processing delay for processing the round trip time measurement request and the round trip time measurement response, and further configured to determine at least one of a round trip time measurement prohibit interval and a round trip time measurement transmission interval according to the round trip time and to control the transmitting unit such that transmission of a next round trip time measurement request is prevented according to the round trip time measurement prohibit interval and transmission of a next round trip time measurement request is initiated according to the round trip time measurement transmission interval.

20. The apparatus of claim 19, wherein the processing unit is further configured to determine at least a data block retransmission prohibit interval or a data block retransmission interval according to the round trip time, and
wherein the data block retransmission prohibit interval prevents sending a data block retransmission request to resend a data block and the data block retransmission interval initiates sending a data block retransmission request to resend a data block.

21. The apparatus of claim 19, wherein the processing unit is further configured to control the transmitting unit to periodically transmit a data block retransmission request until receipt of a data block is acknowledged such that the time between successive data block retransmission requests is at least as great as the round trip time.

22. The apparatus of claim 19, wherein the processing unit is further configured to set the first identifier as a sequence number.

23. The apparatus of claim 19, wherein the processing unit is further configured to determine the round trip time when the first identifier is the same as the second identifier.

24. The apparatus of claim 19, wherein the processing unit is further configured to include the transmission time of the round trip time measurement request in the round trip time measurement request.

25. The apparatus of claim 19, wherein the processing unit is further configured to determine the round trip time by calculating a difference between a transmission time of the round trip time measurement request and the reception time of the round trip time measurement response.

26. The apparatus of claim 19, wherein the processing unit is further configured to include the round trip time measurement request in a status Protocol Data Unit (PDU) or a piggybacked status PDU and to extract the round trip time measurement response from a status PDU or a piggybacked status PDU.

27. The apparatus of claim 19, wherein the processing unit is further configured to determine the round trip time by computing an average of a plurality of round trip times determined based on the transmission times of a plurality of round trip time measurement requests and the reception times of a plurality of round trip time measurement responses.

28. The apparatus of claim 19, wherein the processing unit is further configured to control the transmitting unit to transmit a plurality of round trip time measurement requests consecutively,
wherein each of the plurality of round trip time measurement requests has the same first identifier.

29. The apparatus of claim 19, wherein the processing unit is further configured to process a plurality of consecutively received round trip time measurement responses,
wherein each of the plurality of round trip time measurement responses has the same second identifier.

30. The apparatus of claim 19, wherein the wireless communication system supports a data receipt acknowledgement from the receiving device.

* * * * *